Patented Jan. 30, 1940

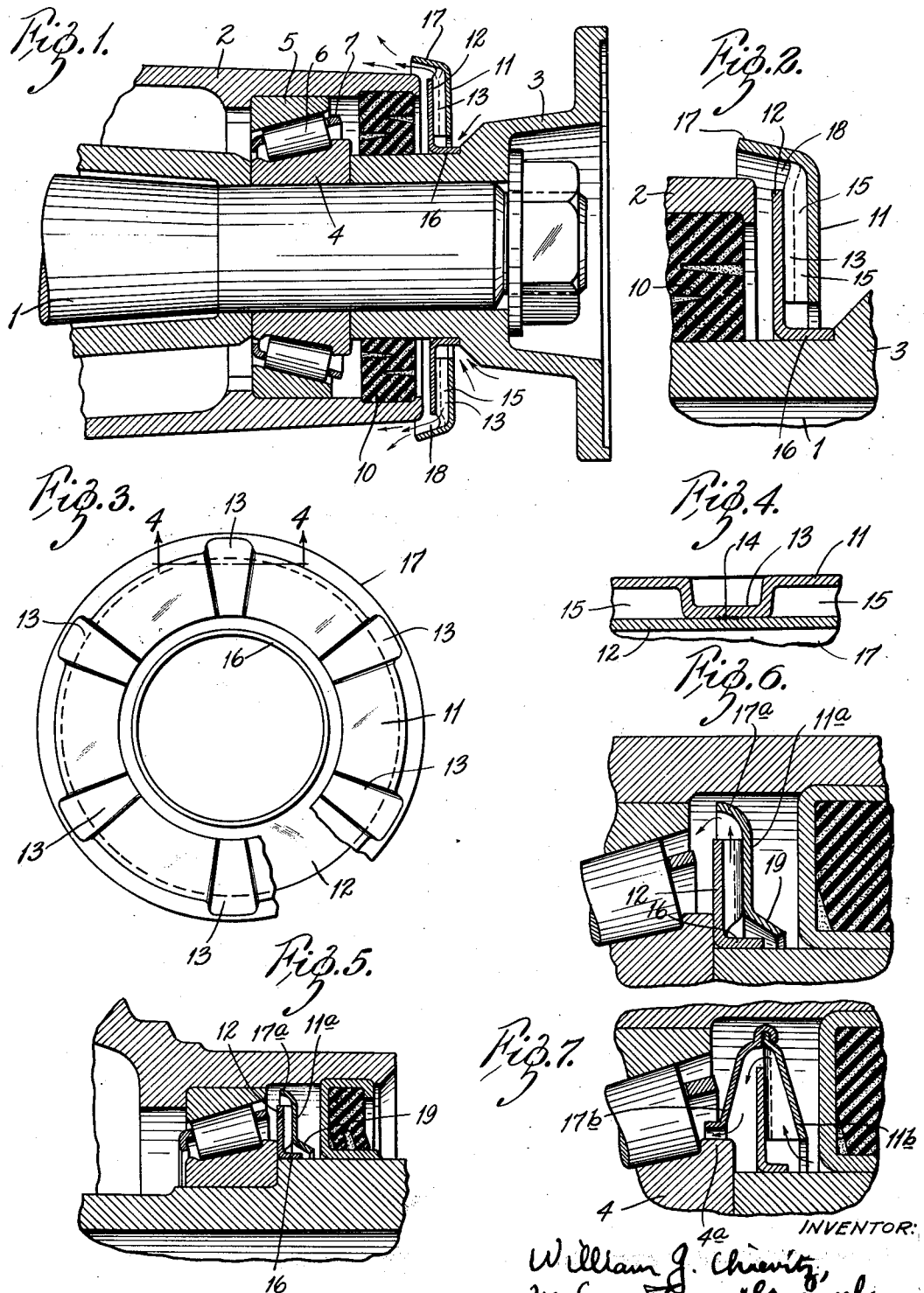

2,188,856

UNITED STATES PATENT OFFICE 2,188,856

OIL OR DUST FLINGER FOR BEARINGS

William J. Chievitz, Canton, Ohio, assignor to The Timken Roller Bearing Company, Canton, Ohio, a corporation of Ohio Application November 26, 1937, Serial No. 176,520

4 Claims. (Cl. 286—5)

My invention relates to deflectors of the kind that are adapted to be mounted on rotary shafts for excluding dust or preventing the escape of oil. The invention consists in the parts and combinations of parts hereinafter described and claimed.

In the accompanying drawing which forms part of this specification and wherein like numerals refer to like parts wherever they occur, Fig. 1 is a longitudinal sectional view of my deflector applied to a shaft construction to function as a dust excluder;

Fig. 2 is a similar view on an enlarged scale of part of the device shown in Fig. 1;

Fig. 3 is an end view of my device with a portion broken away;

Fig. 4 is an enlarged detail view of a portion of the device on the section line 4—4 of Fig. 3;

Figs. 5 and 6 are sections similar to Figs. 1 and 2 illustrating a modification wherein the deflector is arranged to operate as an oil-return device;

Fig. 7 is a sectional view of another modification.

In the construction illustrated in Figs. 1 and 2, 1 represents a rotary shaft, 2 represents a stationary housing, 3 represents a coupling member on the shaft, 4 represents the cone or inner raceway member of a tapered roller bearing, 5 represents the cup or outer raceway member of said taper roller bearing, 6 represents a series of taper rollers cooperating with said members and 7 represents a cage for said taper rollers.

According to the present invention, an elastic ring 10 of synthetic rubber or other suitable material is mounted in the stationary housing beyond the roller bearing and with its inner surface making a sliding fit with the outer surface of the shaft coupling member.

Mounted on the outer surface of the shaft coupling member so as to turn therewith is a deflector device which, in the position shown, serves as a dust guard. This dust guard comprises two concentric disks 11, 12 whose main body portions are spaced apart longitudinally of their axes. Preferably, one of the disks, namely, disk 11, has a series of radial spokes 13 or offsets pressed therein, and the other disk 12 abuts flatwise against these spokes or offset portions and is welded thereto, as indicated at 14, thus forming a series of wide radially disposed channels 15 between the body portions of the two disks. One of said disks 12, hereinafter sometimes called the inner disk, has a cylindrical hub or barrel portion 16 which fits tight on the shaft coupling member. The other disk 11, hereinafter sometimes called the outer disk, has its inner periphery spaced outwardly from the barrel portion of the inner disk and has its outer portion formed into an outwardly flaring flange 17 which preferably extends over and beyond the outer edge of the inner disk, leaving an annular space 18 between them.

The operation of the device hereinbefore described is as follows: When the shaft rotates, the metal deflector or dust excluder rotates with it and generates a current or currents of air therethrough after the manner of a centrifugal pump. The air enters the annular opening between the hub of the inner disk and the inner periphery of the outer disk and thence travels through the radial passageways and is deflected longitudinally by the overhanging flaring portion of the outer disk. Thence it travels endwise beyond the surface of the housing, thus excluding the dust from contact with the elastic ring of synthetic rubber or the like.

In the construction hereinbefore described, the elastic sealing ring is located between the roller bearing and the deflector and operates to deflect the dust away from the sealing ring. In the constructions illustrated in Figs. 5, 6 and 7, the deflector is located between the roller bearing and the sealing ring and operates to deflect and return oil to the bearing before it reaches the sealing ring.

The construction of the deflector of Figs. 5 and 6 is generally similar to the deflector of Fig. 1 hereinbefore described. In the modification of Figs. 5 and 6, however, the outer disk member 11a has a conical extension 19 at its inner periphery whose narrow diameter is fairly close to the outer diameter of the outside diameter of the hub portion of the inner disk 12. In this modification, the inner disk abuts endwise against the inner raceway member of the roller bearing and the conical portion of the outer disk is spaced away from the oil seal member as well as from the shaft or shaft coupling member. The operation of the modification shown in Figs. 5 and 6 is as follows: Whatever oil reaches the space between the end of the barrel of the inner disk and the conical extension of the outer disk will, under the influence of centrifugal action, be forced radially outwardly until it reaches the overhanging peripheral portion 17a of the outer disk whereby it is deflected back toward the roller bearing.

The modification illustrated in Fig. 7 is similar to that of Figs. 5 and 6 except that the deflecting portion 17b of the outer disk 11b is extended inwardly at an angle close to the bearing surface of the thrust shoulder 4a of the inner raceway member 4 and thus serves as a guide for directing the oil to said thrust shoulder.

It is noted that in the arrangement shown in Figs. 1 and 2, the deflector device is located on the shaft coupling device entirely outside of the housing and is independent of both the housing and the elastic sealing ring. In the arrangements illustrated in Figs. 5, 6 and 7, the deflector device is mounted on the shaft inside of the housing but independently of both the housing and the oil seal.

What I claim is:

1. A deflector of the kind described comprising two concentric annular disks secured together with their body portions spaced apart, one of said disks having its main body portion imperforate and having a hub portion adapted for mounting on a shaft and the other disk surrounding said hub portion and having a flaring portion overlapping the outer margin of said first-mentioned disk and with its inner margin spaced outwardly with relation to the hub portion of said first-mentioned disk to admit air between them.

2. A deflector of the kind described comprising two concentric annular disks, one of which has longitudinally offset portions secured flatwise to the other disk to space the main body portions apart, one of said disks having its main body portion imperforate and having a hub portion adapted for mounting on a shaft and the other disk surrounding said hub portion and having a flaring portion at its outer margin overlapping the outer margin of said first-mentioned disk and with the inner margin spaced outwardly beyond the end of the hub portion of said first-mentioned disk.

3. A deflector of the kind described comprising two concentric annular disks, one of which has longitudinally offset portions secured flatwise to the other disk to space the main body portions apart, one of said disks having its main body portion imperforate and having a hub portion adapted for mounting on a shaft and the other disk surrounding said hub portion and having a flaring portion overlapping the outer margin of said first-mentioned disk and with its inner margin extended inwardly in conical form close to but spaced from the end of the hub portion of said first-mentioned disk.

4. A deflector of the kind described comprising two concentric annular disks, one of which has longitudinally offset portions secured flatwise to the other disk to space the main body portions apart, one of said disks having its main body portion imperforate and having a hub portion adapted for mounting on a shaft and the other disk surrounding said hub portion and being doubled back around and spaced from the outer margin of said first-mentioned disk in the form of a truncated cone whose small diameter is greater than the inside diameter of the opposite end of said second-mentioned disk, and with the inner margin of said second-mentioned disk spaced outwardly beyond the end of the hub portion of said first-mentioned disk.

WILLIAM J. CHIEVITZ.